Figure 1:
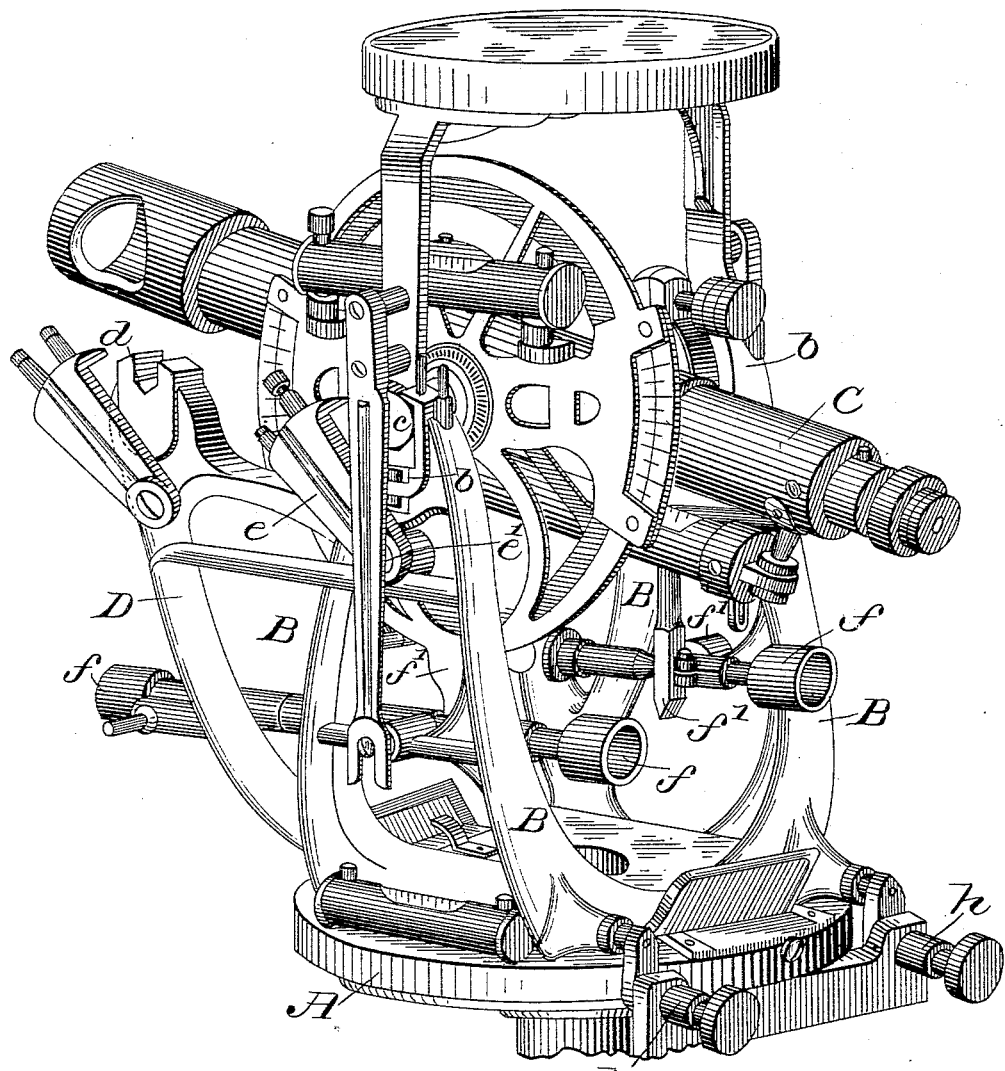

(No Model.)  2 Sheets—Sheet 1.

C. L. BERGER.
ENGINEER'S TRANSIT.

No. 476,510.  Patented June 7, 1892.

Witnesses.
Fred N. Ashworth
Edward F. Allen.

Inventor.
Christian L. Berger.
by Crosby & Gregory
Attys.

(No Model.) 2 Sheets—Sheet 2.

C. L. BERGER.
ENGINEER'S TRANSIT.

No. 476,510. Patented June 7, 1892.

Witnesses.
Fred N. Ashworth.
Edward F. Allen.

Inventor.
Christian L. Berger.
by Crosby & Gregory
attys.

UNITED STATES PATENT OFFICE.

CHRISTIAN L. BERGER, OF BOSTON, MASSACHUSETTS.

ENGINEER'S TRANSIT.

SPECIFICATION forming part of Letters Patent No. 476,510, dated June 7, 1892.

Application filed February 20, 1892. Serial No. 422,229. (No model.)

*To all whom it may concern:*

Be it known that I, CHRISTIAN L. BERGER, of Boston, county of Suffolk, State of Massachusetts, have invented an Improvement in Engineers' Transits, of which the following description, in connection with the accompanying drawings, is a specification, like letters on the drawings representing like parts.

Transits as commonly constructed have the telescope mounted with its horizontal axis of revolution intersecting the vertical axis of the frame and its supporting-plate. The use of transits of this class is limited to the measurement of horizontal angles in which the elevation or depression of the points does not exceed fifty-five degrees, more or less, it being impossible to revolve the telescope on its horizontal axis more than about fifty-five degrees without the line of sight being obstructed by the supporting-plate. Transits having the telescope mounted in this manner are unsuitable for use in mines or other places where it is necessary to direct the line of sight vertically, or nearly so, either up or down, and to adapt transits for this peculiar yet extensive class of work it has been common to provide a second or auxiliary telescope, to be attached either to the end of the horizontal axial bearing of the main telescope or supported in a suitable frame carried by and parallel with the main telescope, so that the line of sight through the auxiliary telescope will be so far removed to one side of the frame and its supporting-plate as to be unobstructed thereby.
These transits are less accurate on account of the eccentricity due to the position of the second or auxiliary telescopes, which telescopes, as a rule, are not sufficiently powerful for long sights. These transits are also objectionable, owing to the excessive counterpoise which must be carried, making the instruments top-heavy. In striving to obviate these objections transits have been constructed having the standards or supporting-frame inclined forward, so that the horizontal axial bearings will be carried so far out to one side of the standards and supporting-plate that a single main telescope mounted in such bearings may be used for both horizontal and vertical sights without obstruction. While the horizontal bearings when arranged in this position permit the use of a single telescope for both horizontal and vertical sights, the frame, which must be made as light as possible to avoid excessive counterpoise, is necessarily weak and unsteady laterally, necessitating the use of V-shaped journals on the telescope's horizontal axis of revolution to stiffen the standards laterally. The use of V-shaped or other similar journals, however, prevents the telescope being turned over in its bearings for reversing purposes, such reversals being necessary for accurate work, whether long or short sights are taken, or when it is not desired to reverse the instrument on its vertical axis of revolution. The inclined standards carrying the telescope so far to one side of the vertical axis of revolution also necessitates an excessive counterpoise.

This invention has for its object to provide a transit to overcome the objections above noted, which object is accomplished by providing a frame having two sets of horizontal axial bearings, the axis of one set of bearings preferably intersecting the vertical axis of revolution, and in which the telescope is mounted when used in ordinary work, while the other set of bearings is arranged at such other desired point on the standard-frame or the horizontal plate as shall permit the telescope when mounted therein to be turned in either direction vertically without the line of sight being obstructed by the frame or supporting-plate.

Other advantageous features of this invention will be hereinafter described, and pointed out in the claims.

Figure 2:
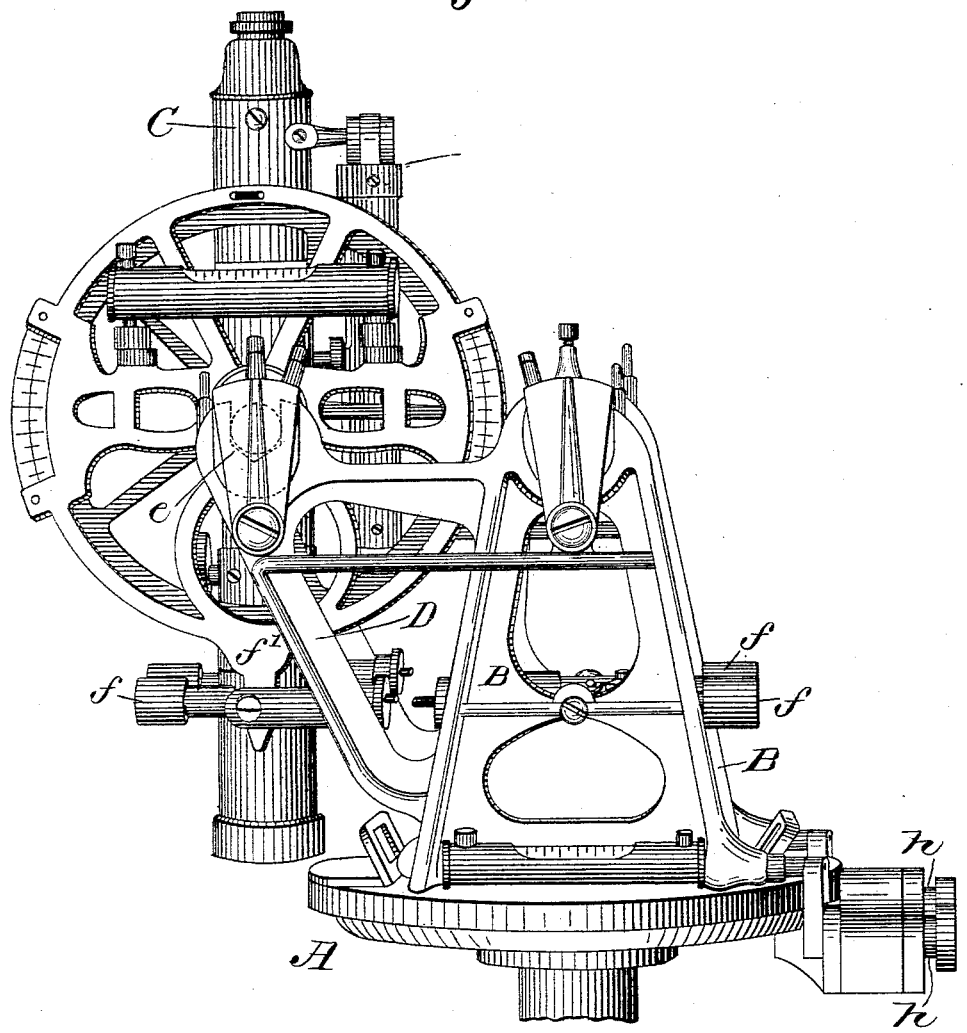

Figure 1 of the drawings represent in perspective a transit embodying this invention; and Fig. 2, a side elevation of the transit-frame, showing the telescope as mounted in the auxiliary bearings.

Referring to the drawings, A represents the vernier-plate common to instruments of this class, and which is supported in the usual manner upon the usual leveling-screws (not shown) and made to revolve about a vertical axis.

B represents the U-shaped supporting-frame for the telescope, said frame being mounted upon a plate A and having one set of normal journal-bearings *b*, arranged with their common axis intersecting the vertical axis of revolution of the plate A, to receive the journals c of the telescope C of usual or desired kind or construction.

In accordance with this invention the frame B is provided with a second auxiliary set of bearings d, formed in the arms or brackets D of and forming a part of the main supporting-frame B, said bearings being so far offset from the normal bearings b that when the telescope is transferred from the normal to the auxiliary bearings, as shown in Fig. 2, it will be in such a position that it may be directed vertically either up or down without obstruction of its line of sight by the plate A or its supports.

By the term "bearings," as herein employed, I do not restrict myself to any particular form or construction of bearings, such term being intended to include bearings formed in the frame itself or in boxes or other devices carried in or by suitable seats provided for that purpose in the frame.

As represented in the drawings, protection-clasps e, each having an inturned lip at right angles thereto, are provided, pivoted horizontally at e' to the frame, as shown, which clasps are turned up, so that the lips project inwardly over the journals of the telescope to retain the same in the bearings when the instrument is not in use; or, if desired, such clasps may be employed when the instrument is in use. Such protection-clasps may, if desired, be omitted from the auxiliary bearings.

The usual vertical tangent-screw motion for the telescope is provided, such motion in the present instance containing four tangent screws f, mounted upon the frame, two to co-operate with the tangent arms f' when the telescope is in its normal bearings and the other two to co-operate with the said arms when the telescope is in its auxiliary bearings. In lieu of this arrangement I may provide each tangent arm with two adjusting-screws and provide the frame with four studs, two of which will be used in connection with the adjusting-screws when the telescope is in its normal bearings and the other two to be used in connection with the adjusting-screws when the telescope is in its auxiliary bearings. I consider one arrangement the full equivalent of the other.

In use the telescope will preferably for ordinary work be mounted in the normal bearings b, it being possible to measure angles wherein the elevation or depression of the points does not exceed fifty-five degrees (more or less) without changing the telescope; but when it becomes necessary to direct the line of sight vertically, as when the transit is in use in mines, the protection-clasps will be turned down, as shown in Fig. 1, the telescope with its tangent screws and other attachments will be lifted from its bearings b and placed in the auxiliary bearings d, when the telescope may be directed vertically in either direction without obstruction of its line of sight by the frame or plate. When the telescope is mounted in its auxiliary bearings, a counterpoise of sufficient weight will be attached to the plate A at that side opposite the eccentric bearings by screw-studs h provided for that purpose. As the frame B is in practice formed of aluminum, no counterpoise will be necessary for the arm or brackets D when the telescope is mounted in its normal bearings, such slight additional weight of the arms D being counterbalanced by the screws h, which are made of brass or other heavier metal, so that the counterpoise attached by the screws h when the telescope is transferred to its auxiliary bearings need be of such weight only as will counterbalance the telescope with its attachments.

A transit constructed in accordance with this invention presents the following advantages over any transit heretofore known to me. By providing two sets of journal-bearings for a telescope, in one of which the telescope may be turned for vertical sights without its line of sight being obstructed by the frame, no second or auxiliary telescope for vertical sights is rendered necessary. The weakness incident to the use of the inclined frame, previously referred to, is overcome by the construction involved in this invention, for the reason that the U-shaped frame B is of such stiffness that the arms D, carrying the auxiliary bearings, are also necessarily sufficiently stiff laterally. Again, by providing a frame, as described, which in itself possesses sufficient stiffness the use of V-shaped or other equivalent journals on the telescope is avoided and plain cylindrical journals and Y-bearings used in their stead, the great advantage of cylindrical journals over the V-shaped or other journals being that the telescope may readily be reversed over the bearings for sighting and testing purposes.

While I prefer to employ substantially the frame herein shown, still this invention is not restricted to such a particular construction, inasmuch as the bearings may be arranged in any other desired manner on the frame or on the vernier-plate A, which in effect forms a part of the frame, the only requirement being that journal-bearings shall be provided for the pivots of the telescope to support the latter in an auxiliary position at such a point that when turned in said bearings for vertical sights the line of sight will be unobstructed by any part of the frame.

The gist of this invention therefore consists in a supporting-frame for a telescope having two sets of journal-bearings, each set to receive the pivots upon the opposite sides of the telescope, one set of bearings being arranged to permit vertical sights through the telescope without obstruction by the frame.

By the term "two sets of bearings," as employed in the claims, I intend to include an arrangement of the bearings wherein one bearing is common to both sets—as, for instance, if a third bearing should be mounted at one side of but in the same axis with the normal bearings of the frame B, two sets of bearings would be provided, one set of which, however, would hold the telescope with its axis intersecting the vertical axis of revolution, while the other set of bearings would hold the telescope so far to one side of the normal bearings that vertical sights may be had without interfering with the frame, the middle bearing, however, being common to both sets.

This invention is not restricted to transits, as it is equally applicable to theodolites and some astronomical instruments.

The term "frame," as used in the claims, includes any form of support or standard for the telescope whether such form or standard is mounted on the plate or not.

I claim—

1. In a transit having a single telescope, a supporting-frame having two sets of fixed journal-bearings for the pivots of the horizontal axis of revolution of the telescope, one set of bearings being arranged to permit the telescope when mounted therein to be turned for vertical or nearly vertical sights without obstruction of its line of sight by the frame, substantially as described.

2. In a transit having a single telescope, a supporting-frame having two sets of fixed journal-bearings for the pivots of the horizontal axis of revolution of the telescope, said two sets of bearings being so arranged that the line of sight of the telescope when mounted in either set of bearings will revolve in the same vertical plane, substantially as described.

3. In a transit having a single telescope, a supporting-frame for the telescope, adapted to revolve with the vertical axis of revolution and having two sets of journal-bearings for the pivots of the horizontal axis of revolution of the telescope, the axis of one set of bearings intersecting the vertical axis of revolution of the frame, while the other set of bearings is offset therefrom to permit the telescope when mounted therein to be turned about its horizontal axis of revolution for vertical or nearly vertical sights without obstruction of its line of sight by the frame, substantially as described.

4. In a transit, a U-shaped supporting-frame B, having normal bearings $b$ for the telescope and auxiliary bearings $d$, supported by the U-shaped frame B and so far offset therefrom that the vertical line of sight of a telescope mounted therein will be unobstructed by said frame, substantially as described.

5. In a transit, the combination, with a telescope, of a supporting-frame therefor, having two sets of bearings and two sets of vertical tangent adjusting-screws for said telescope, substantially as described.

In testimony whereof I have signed my name to this specification in the presence of two subscribing witnesses.

CHRISTIAN L. BERGER.

Witnesses:
FREDERICK L. EMERY,
FRANCES M. NOBLE.